US006996572B1

(12) United States Patent
Chakrabarti et al.

(10) Patent No.: US 6,996,572 B1
(45) Date of Patent: Feb. 7, 2006

(54) METHOD AND SYSTEM FOR FILTERING OF INFORMATION ENTITIES

(75) Inventors: Soumen Chakrabarti, San Jose, CA (US); Byron Edward Dom, Los Gatos, CA (US); David Andrew Gibson, Berkeley, CA (US); Jon Michael Kleinberg, Ithaca, NY (US); Prabhakar Raghavan, Saratoga, CA (US); Sridhar Rajagopalan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 965 days.

(21) Appl. No.: 08/947,221

(22) Filed: Oct. 8, 1997

(51) Int. Cl.
G06F 17/00 (2006.01)
(52) U.S. Cl. .................................. 707/102; 715/501.1
(58) Field of Classification Search ................ 707/5, 707/100, 101, 501, 102; 715/501.1; 705/27; 907/1–5, 100, 101, 102, 104.1
See application file for complete search history.

(56) References Cited

U.S. PATENT DOCUMENTS

| 5,257,185 | A |   | 10/1993 | Farley et al. ........... 364/419.19 |
| 5,446,891 | A |   | 8/1995  | Kaplan et al. ............... 395/600 |
| 5,535,382 | A | * | 7/1996  | Ogawa ........................... 707/5 |
| 5,727,129 | A | * | 3/1998  | Barrett et al. ................ 706/10 |
| 5,778,362 | A | * | 7/1998  | Deerwester .................... 707/5 |
| 5,819,258 | A | * | 10/1998 | Vaithyanathan et al. ....... 707/2 |
| 5,832,494 | A | * | 11/1998 | Egger et al. ................ 102/102 |
| 5,835,905 | A | * | 11/1998 | Pirolli et al. ................... 707/3 |
| 5,855,015 | A | * | 12/1998 | Shoham .......................... 707/5 |
| 5,940,821 | A | * | 8/1999  | Wical ............................. 707/3 |
| 6,041,311 | A | * | 3/2000  | Chislenko et al. ............ 705/27 |

FOREIGN PATENT DOCUMENTS

JP    63-228221    9/1988

OTHER PUBLICATIONS

White et al, "Similarity Indexing with the SS-tree", Data Engineering 1996, Proceedings of the Twelfth International Conference, pp516-523.*
Yuwono et al, "Search and Ranking Algorithms for Locating Resources on the World Wide Web", Data Engineering 1996, Proceedings of the Twelfth International Conference, pp 164-171.*
Microsoft Press Computer Dictionary, Third Edition, 1997, pp. 240, 478.*

(Continued)

Primary Examiner—Uyen Le
(74) Attorney, Agent, or Firm—John L. Rogitz (57) ABSTRACT

A system and method are provided for eliciting interesting structure from a collection of entities or resources with explicit and/or implicit, static and/or dynamic relations, called "affinities," between them. Interesting structure includes (1) notions of quality, authority, or definitiveness of information, (2) notions of relevance to a user's information need, (3) notions of similarity among the plurality of resources retrieved from a universe of resources by a query process, and (4) notions of similarity among the usages of resources by different users/servers. Similarities between entities are computed, based on similarities between the affinity values for the entities. That is, where the affinity values for two entities resemble each other, the two entities have a high degree of similarity. Using the similarities, the entities are ranked, clustered, etc., based on a significance derived from the similarities. The ranking, clustering, etc., makes up the interesting structure which is sought.

12 Claims, 4 Drawing Sheets

OTHER PUBLICATIONS

H. C. Arents et al., "Concept-based Retrieval of Hypermedia Information: From Term Indexing to Semantic Hyperindexing", *Information Processing & Management*, vol. 29, No. 3, 1993, pp. 373-386.

J. Bichteler et al., "Document Retrieval by Means of an Automatic Classification Algorithm for Citations", *Information Storage and Retrieval*, vol. 10, No. 7-8, Jul./Aug. 1971, pp. 267-279.

M. E. Frisse, "Searching for Information in a Hypertext Medical Handbook", *Communications of the ACM*, vol. 31, No. 7, Jul. 1988, pp. 880-886.

G. H. Golub et al., "Matrix Computations", 2nd Ed., *The Johns Hopkins University Press*, 1989, pp. 218-219, 351-354.

T. R. Kochtanek, "Document Clustering, Using Macro Retrieval Techniques", *Journal of the American Society for Information Science*, vol. 34, No. 5, Sep. 1983, pp. 356-359.

F. Nanin et al., "Bibliometrics", *Annual Review of Information Science and Technology*, 1977, pp. 35-57.

R. Rada et al., "Retrieval Hierarchies in Hypertext", *Information Processing & Management*, vol. 29, No. 3, 1993, pp. 359-371.

E. Rivlin et al., "Navigating in Hyperspace: Designing a Structure-based Toolbox", *Communications of the ACM*, vol. 37, No. 2, Feb. 1994, pp. 87-96.

R. W. Schwanke et al., "Cross References are Features", *Springer-Verlag*, 1993, pp 107-123.

W. M. Shaw, Jr., "Subject Indexing and Citation Indexing—Part II: An Evaluation and Comparison", *Information Processing & Management*, vol. 26, No. 6, 1990, pp. 705-718.

W. M. Shaw, Jr., "Subject and Citation Indexing—Part I: The Clustering Structure of Composite Representations in the Cystic Fibrosis Document Collection", *Journal of the American Society for Information Science*, vol. 42, No. 9, 1991, pp. 669-675.

W. M. Shaw, Jr., "Subject and Citation Indexing—Part II: The Optimal, Cluster-based Retrieval Performance of Composite Representations", *Journal of the American Society for Information Science*, vol. 42, No. 9, 1991, pp. 676-684.

D. A. Spielman et al., "Spectral Partitioning Works: Planar Graphs and Finite Element Meshes", *Based on UC Berkeley Technical Report UCB//CSD-96-898*.

R. Weiss et al., "HyPursuit: A Hierarchical Network Search Engine that Exploits Content-Link Hypertext Clustering", *MIT Laboratory for Computer Science*, Cambridge, MA, no date.

\* cited by examiner

METHOD AND SYSTEM FOR FILTERING OF INFORMATION ENTITIES

FIELD OF THE INVENTION

The invention generally relates to the field of data processing. More specifically, the invention relates to the extraction of information, relating to a collection of data entities or resources having relations between them, regarding aspects of the entities or resources, and their relations, which are likely to be of interest to users. The invention has particular applicability to the fields of Internet/World Wide Web "surfing," and data mining, among others.

BACKGROUND OF THE INVENTION

Today's state-of-the-art data storage and information processing technology makes it possible to provide a user with a volume of information so great that a separate field is developing, of how to enable a user to exploit the information. Broadly stated, a user's goal is to elicit interesting structure from a collection of entities or resources with explicit and/or implicit, static and/or dynamic relations between them.

This broad statement of the user's goal may be illustrated by a few prominent examples.

For instance, in the developing field of data mining, the collection of entities includes a compiled collection of information items, for instance retail merchant/purchaser transactions. The relations between the transactions, in this example, are the fact that all purchases are made from a given set of types of inventoried goods.

Data mining is a process that has been used to identify, as "interesting structure," commonalities between transactions. For instance, consider a body of supermarket customer purchase transactions. A class of association rules, such as a rule that, to a given level of certainty, a purchaser of Brie cheese will also purchase Chardonnay wine, may be an interesting structure that can be derived from such a database.

A class of sequential patterns may be derived from a set of video rental transactions including repeat customer identifications. The sequential patterns may include, for instance, a pattern that a person who rents "Star Wars" will subsequently rent "The Empire Strikes Back."

Examples of conventional data mining technology may be found in co-assigned U.S. Pat. No. 5,615,341, Agrawal and Srikant, "System and Method for Mining Generalized Association Rules in Databases."

Another example of the above broad statement of the user's goal relates to the World Wide Web. A collection of entities comprises the Web pages available over various servers on the Internet.

Note that it will tend to be the case that links between Web pages indicate some commonality of subject matter between the pages.

The relations between the Web pages may be taken as the hyperlinks between them. The relation may be a Boolean relation, in the sense that there either are, or are not, links between two pages, or may be a numerical relation, giving the number of links. Also, a relation may be directional and asymmetric. For instance, there may be two links from page A to page B, but none from page B to page A. In such a case, both the Boolean and numerical relations will have two different values for the two directions.

An "interesting structure" which can be derived from the Web has been explored in co-assigned U.S. Pat. No. 6,112,202, Kleinberg, "Method and System for Identifying Authoritative Information Resources in an Environment with Content-Based Links Between Information Resources." Techniques are described for determining a measure of authoritativeness for a given Web page, as to a given area of subject matter, based on the links to and from other pages on related subject matter.

Yet another example of the above broad statement of the users goal relates to content-based searching of a database of text files. Conventional keyword searching is known to produce a large number of false hits and misses, relative to the number of items that might actually meet the user's desires. U.S. Pat. No. 4,839,853, Deerwester et al., "Computer Information Retrieval Using Latent Semantic Structure," starts from the premise that entities (text data objects) contain relations (corresponding word occurrence frequencies) that are not necessarily detected through keyword searching. The Deerwester system uses a matrix/vector scheme to bring out this underlying relation, to produce an "interesting structure" in the form of statistical information which may be used to enhance the quality of the output of a query.

There are, however, numerous further possibilities for achieving the users goal which have not conventionally been realized. Accordingly, there is a need for further techniques which will further assist the user.

SUMMARY OF THE INVENTION

It is therefore an object of the invention to offer a generalized approach to the task of eliciting interesting structure from a collection of entities or resources with explicit and/or implicit, static and/or dynamic relations between them.

To achieve these and other objects, there is provided, in accordance with the invention, a method for eliciting information, useful to a user, from a collection of entities or resources with explicit and/or implicit, static and/or dynamic relations therebetween.

The method of the invention comprises the following steps:

The collection of entities is obtained. Also obtained, are affinity values, including, for each given one of the entities, one or more respective affinity values for the given entity and each respective one of the other entities of the collection.

The affinity values are combined to form a similarity value, including, for each respective one of the entities, a similarity value for the entity and for each respective other one of the entities in the collection.

Significance values are initialized for each of the entities.

Then, an iterative calculation is performed to update the significance values. Preferably, the calculation is based on the similarities and on the significance values prior to the iterative update. Iterations are continued until a predetermined condition is reached.

Finally, the desired useful information is obtained based on the significance values after the final iteration of the step of iteratively calculating.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

Glossary of Terms Used in the Description of the Invention

Entities:

Entities are objects, such as documents, users, books, movies, words, relational tables, etc., about which a user would like to extract some information. In fact, the invention is directed to the task of extracting information about collections of such entities, or, more specifically, about the relationships among the entities in the same collection, or about the relationships between the entities in one collection and those in other collections. The entities in one collection may be of a different type than those in the others.

Here are a few examples of sets of entities which may be acquired for use with the invention (particular techniques for getting the entities will be clear, given the enumeration of the exemplary sets of entities themselves):

With regard to the Internet, sets of entities could include web pages and hyperlinks, for instance the raw results of a search;

Also with regard to the Internet, sets of entities could further include the further set of information resources linked to the information resources found by the above-mentioned search;

People, along with information resources of interest to them, such as movies (e.g. collaborative filtering);

terms and documents containing the terms.

Affinities:

Affinities describe the fundamental relationships among the entities.

For instance, suppose there is a set of document entities including the King James Bible and Peter Benchley's "Jaws." Suppose further that there is a set of word entities including "thee," "thou," and "shark." A possible affinity would be the numerical count of occurrences of a word entity in a document entity. Thus, the King James Bible will contain a large number of occurrences of the archaic words "thee" and "thou," while "jaws" contains no occurrences. By contrast, "Jaws" contains occurrences of "shark" numbered, perhaps, in the hundreds, while the King James Bible contains none (or at any rate, few: Applicants's attorney does not claim to be a Bible scholar, but believes that the above speculations as to word occurrences are reasonable for the sake of discussion and illustration).

The affinity of node A for node B will, in general, not equal the affinity of node B for node A. For example, the affinity of document A to document B may be defined as 1 if there is a hyperlink from A to B, and as zero otherwise. It will be seen that such an affinity measure is not symmetric.

Affinities may, in many instances, be characterized as "directed," i.e., non-symmetric. That is, suppose an affinity a is defined, having values $a(u,v)$ and $a(v,u)$ between entities u and v. If a is directed, then the $u \rightarrow v$ affinity $a(u,v)$ need not be the same as the $v \rightarrow u$ affinity $a(v,u)$. For example, a word may occur in a document, but a document does not occur in a word. Thus, the word/document example given above illustrates the directional aspect of affinities.

Here are some examples of attributes of various types of entities, wherein the attributes may be regarded as affinities between the entities:

An affinity between hypertext documents (e.g., World Wide Web pages) could have a Boolean value, such as 1/0, based on the existence or non-existence of hyperlinks between the hypertext documents.

An affinity between patents or papers in the technical literature could have a Boolean value, such as 1/0, based on the existence or non-existence of reference citations in one technical paper or patent to another. Alternatively, the affinity could have an integral value based on the number of distinct points in the citing document to the cited document.

An affinity is computed when there are no explicit links, e.g., based on the contents of the information entities. One of the sets of entities consists of human subjects. For instance, for entity sets of persons and movies, an affinity might be a quantitative measurement of how well a person likes one of the movies. One possible such affinity is the familiar one-to four-star rating scheme.

Affinity Matrices:

Multiple affinities, given in the form of matrices, may be used in the method of the invention. There may be multiple affinity matrices between the same two sets of entities or there may be multiple affinity matrices because there are more than two sets of entities or due to a combination of both.

For instance, suppose there is an affinity a for two sets $\{u_1, u_2\}$ and $\{v_1, v_2\}$ of entities. Then, the affinities could be placed into a matrix A, as follows:

$$A = \begin{vmatrix} a(u_1, v_1) & a(u_1, v_2) \\ a(u_2, v_1) & (u_2, v_2) \end{vmatrix}$$

As another example, suppose there are two affinities $a_1$ and $a_2$ for three sets $\{u\}$, $\{v\}$, and $(w)$ of entities. Then, the affinities could be placed into three matrices $A_{u,v}$, $A_{u,w}$, and $A_{v,w}$, in the general form given above, one matrix for each of the three possible pairs of entities.

For a specific example, consider exemplary sets of three books {the King James Bible, "Jaws," "The Joy of Cooking"} and of four words {thou, shark, flour, water}. If, for the sake of discussion, a few guesses are made as to the number of occurrences of each word in each book, an affinity matrix might look as follows:

|       | Bible | Jaws | Joy  |
|-------|-------|------|------|
| thou  | 6000  | 0    | 0    |
| shark | 10    | 3215 | 133  |
| flour | 100   | 40   | 3321 |
| water | 200   | 3060 | 2856 |

Note that the matrix has different numbers of columns and rows, because the number of words is not equal to the number of documents. Also, the terms do not show any symmetry.

Raw and Derived Affinities:

Affinities can be of two types, raw and derived.

A raw affinity is an affinity expressed directly in terms of its defining parameter. For instance, in the Bible/Jaws/Joy of Cooking example given above, the occurrence counts are an example of raw affinities. In some instances, however, it may be advantageous to modify the affinity values.

One or more raw affinities can be combined, in a number of ways, to obtain other affinities. Such obtained affinities will be called "derived" affinities. Suppose we have multiple affinities $\{a_1, a_2, \ldots\}$, with corresponding raw affinity matrices $\{A_1, A_2, \ldots\}$. A derived affinity d is given by $\phi_d(a_1, a_2, \ldots)$. Derived affinities can be used, in turn, further to obtain more derived affinities.

For instance, there may be some threshold number of occurrences of a word in a document, wherein the threshold number is of particular importance. Thus, a raw affinity might be the occurrence count, and a derived affinity might be a Boolean value, such as 1 or 0, indicative of whether the occurrence count meets or exceeds the threshold value.

Preferred methods for combining affinities include the following operations, performed on either raw affinities or other derived affinities:
a sum operation,
an average operation,
a min operation,
a max operation, and
a linear combination.

Thus, a derived affinity may be a single scalar value derived from a set of raw affinities, such as the sum of a set of raw affinities, a vector, such as a normalized vector derived from a vector of raw affinities, etc.

Affinity Components

Figure 1:
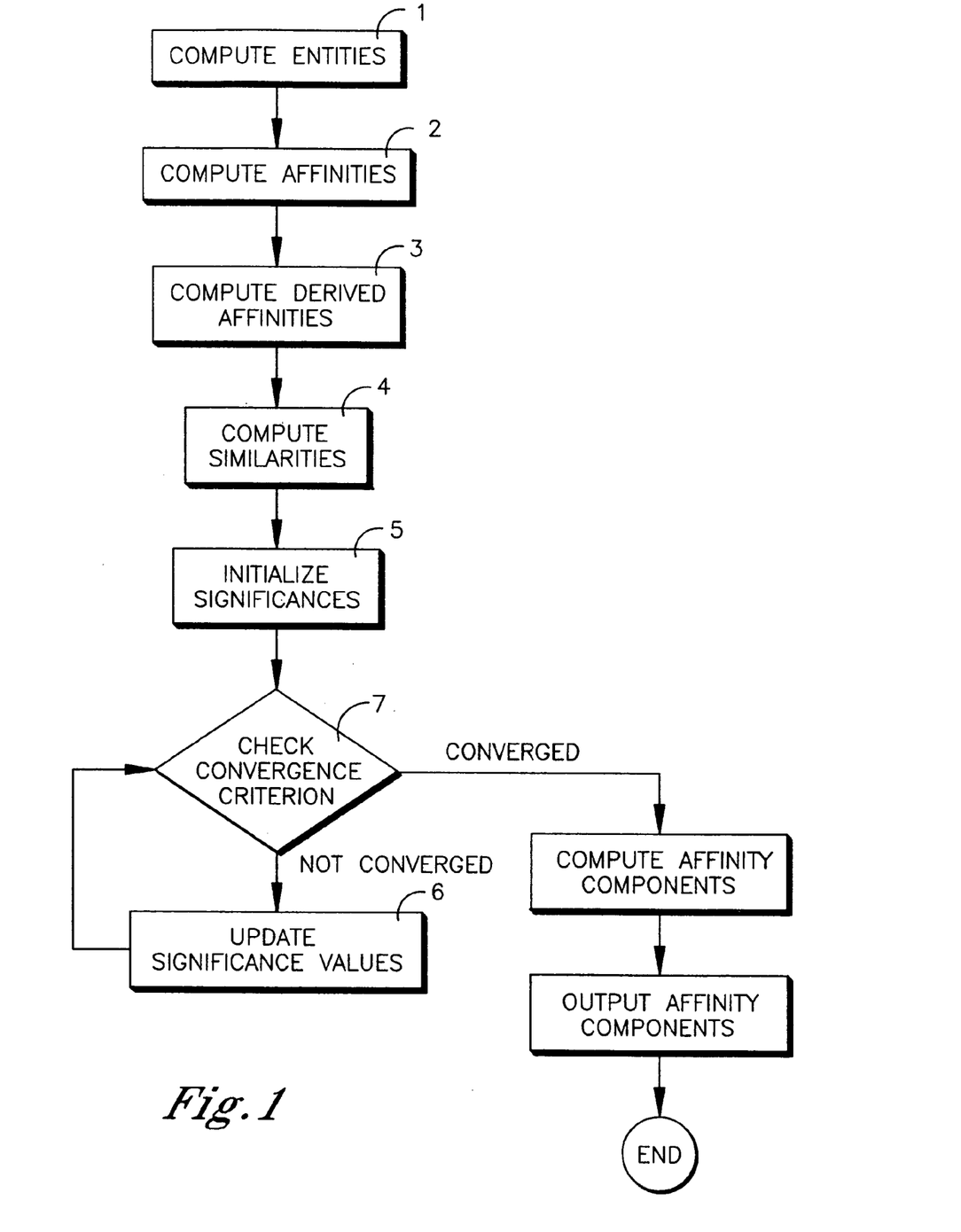
FIG. 1 is a high-level flowchart of the method of the invention.

An affinity component is the resultant obtained by carrying out the iterative process of FIG. 1. Such a component includes an affinity value associated with each entity. These affinity values are collected together into a vector, whose terms are indexed by the entities.

Similarities:

In general, affinities are relationships between entities of different types, such as the number of occurrences of a word (one type of entity) in a document (another type of entity).

Similarities, by contrast, are relationships of like type. For entities u and v, of like type, a similarity relationship m is denoted as m(u,v).

The similarity relationship m(u,v) between two entities is derived from the affinities and it is symmetric. The similarity between two entities is a measure of how similar they are in terms of their affinity relationships.

For instance, a similarity relationship between two word entities might be a degree to which the occurrences of the word in different document entities match each other. Consider the example given above, of sets of word and document entities. The words "thee" and "thou" have a relatively high similarity, in that they both occur in large numbers in the King James Bible, and do not occur in "Jaws." "Shark," by contrast, occurs numerous times in "Jaws," but not in the King James Bible. Therefore, "shark" will have a lower similarity with the other two words of the set.

For this example, a similarity matrix may be derived from the above affinity matrix. The similarity matrix applies to the three documents, and measures similarity based on the affinities given in the affinity matrix. For the symmetry calculations, the sums of the products of the affinities for each of the word entities were computed. Given the organization of the affinity matrix (above), this calculation may be represented in matrix algebra as the product of the matrix A and its transpose $A^T$, that is, the product $AA^T$.

The similarity matrix $M=AA^T$ appears as follows:

|       | Bible    | Jaws     | Joy      |
|-------|----------|----------|----------|
| Bible | 36050100 | 648150   | 904630   |
| Jaws  | 648150   | 19701425 | 9299795  |
| Joy   | 904630   | 9299795  | 19203466 |

Note that, since both rows and columns correspond with the same set of entities (documents), the matrix is square, rather than merely rectangular. Also, note that the term values do show symmetry, because similarity between two entities does not have directionality. Note further that the upper-left-to-lower-right diagonal of the matrix has terms with conspicuously large values. This reflects the unsurprising fact that an entity will resemble itself highly, while it may resemble other entities much less.

Let us now state, more rigorously, that two entities having the same affinities with all other entities will have a high similarity. For example, consider the similarity m, defined for an affinity a over entity sets $\{u\}$ and $\{v\}$, as follows:

$$m(u, v) = \sum_w a(u, w)a(v, w)$$

Assume further that the raw affinity values are numerical, a greater numerical value representing a satisfaction of an affinity condition, and a lesser numerical value representing a failure of satisfaction of the affinity condition.

It will be seen, then, that each term of the sum contributes the most to the sum when the affinity is directed and satisfied, and the lease when the affinity is directed and not satisfied. An intermediate value is contributed to the sum when the affinity is not directed, and the affinity condition is met only one way.

Note also that, when there are two sets of entities (e.g., terms and documents), that the similarities will correspond to one or the other (e.g., depending on whether we use $AA^T$ or $A^T A$). The similarity measures (corresponding to similarity matrices) are only defined for entities from the same set.

A given ranking algorithm ("instance of the method") may use multiple similarity measures. We represent this by m(u,v,k), where k indexes the different measures of the similarity between u and v.

Preferred methods to obtain similarity matrices, denoted M, from affinity matrices include the following:
1. Transposed products;
2. Averaging;
3. Dimension boosting;

and linear combinations of the above spanning one or several affinity matrices.

Significances:

Associated with each node v is a significance of v at time t, denoted by the scalar expression s(v,t). For a set of nodes, the significance values may be grouped and ordered, as the terms of a vector.

The idea is that we wish to rank the entities by these significances, which in most cases are designed to correlate strongly with subjective qualities like goodness or desirability.

Two examples are authority and relevance.

The significance for an entity u is represented by the expression s(u). Note that s(u) is not dependent on any other entities, within or outside the entity set containing u. Significance is global, in the sense that it is based on the overall set of affinities and/or similarities between the entity u and all other entities.

Where multiple similarity measures are used in the same algorithm, a corresponding set of significances is associated with a given entity. For the purpose of the present discussion, significance values for a given entity will be indexed according to their corresponding similarity measures. For instance, s(u,k) is the significance of an entity u, according to the k-th similarity measure.

In accordance with the invention, significances are computed iteratively. The index t will be used to indicate the iteration number, i.e., s(u,t) or s(u,k,t).

Principal Affinity Components (PAC):

PACs are basically the non-principal eigenvectors of the similarity matrix.

Principal affinity components are used for clustering. That is, the final output of the system, an "interesting structure," might include a cluster of entities of high similarity to each other. As will be discussed below, the values of the terms of the PACs will express this similarity.

INTRODUCTION

The goal of the invention is to elicit interesting structure from a collection of entities or resources with explicit and/or implicit, static and/or dynamic relations between them.

Interesting structure includes (1) notions of quality or authority, for instance when seeking definitive sources of information, (2) notions of relevance to the user's information need, (3) notions of similarity among the plurality of resources retrieved from a universe of resources by a query process, and (4) notions of similarity among the usages of resources by different users/servers (often with the purpose of grouping similar users so that they can gain from resources that other users have explored, a process called "collaborative filtering").

In accordance with the invention, clusters of nodes will be sought whose mutual similarities are large. The discussion which follows will describe an algorithmic implementation of a process, given initial sets of entities and affinities, for generating mutual similarity values for the entities. First, a case will be described, for which there is a single notion of similarity between any pair of nodes. Later, a generalization will be described for the case of multiple similarities.

It should be understood that these entities could be users, servers, Web pages, academic papers, articles, law cases, patents, books, images, video; or internal features of documents like the keywords contained in them, keywords semantically associated with them even if they do not occur in the document, or the results of feature extraction procedures.

Additionally, the information sources could be records entered into a collection of databases. Database records may be relational, structured or semi-structured with text and numeric fields. There is no requirement that the entities be made available by a single source. Indeed, the objective is to exploit the reliability/information obtained within the context of a multiplicity of such sources, as is the case in the World Wide Web. However, the ideas apply to the single source situation as well.

The search for structure in the entities may be restricted to any subset of the collection, for instance the subset of documents returned by a search engine in response to a query, or a subset specified by a user as examples of documents he is interested in (for instance, a lawyer may specify a set of cases that he is interested in, and seek authoritative cases relating to the selected ones). More generally, the subset may be enlarged and/or restricted in several ways, for example using the methods in the Kleinberg U.S. Pat. No. 6,112,202 (above).

These entities may or may not have explicit links between them (such as hyperlinks, relations in a database, document that contains a word/phrase). Links are special cases of relations, in the sense that they are binary, i.e. they express a relationship between two entities (page points to page, word contains page, page shares vocabulary with page, user likes page, etc.).

Finally, each instance of a relation has associated with it one or more numerical quantities designated broadly as "affinities". An affinity may be thought of broadly as a similarity measure between the two entities. For instance, if the two entities are two text documents, then one possible affinity is the number of words one document has in common with the other. Numerous different types of affinities may be defined and used, depending on the particular nature of the entities, and on the requirements of the specific application to which the method is applied.

It will generally be the case that an affinity is not just Boolean, but rather a real-valued number. For instance, the number of words in common between two text document entities is such a numerical value. On the other hand, whether a particular subject-matter-specific vocabulary word is present within each of two document entities would be a Boolean affinity.

More generally, these affinities may be changed interactively during a query by a user, or even by the system. Consider, e.g., the relation of terms associated with documents. Initially, one may start with only the terms occurring in the document, but later, as one discovers additional terms strongly associated with the document, say by virtue of hyperlinks, one can update the relation graph.

Other reasons for a gradual evolution of the relation and its weights include, but are not limited to, a change in the data resources in a database induced by the maintainer of the resource, or a change in implicit link structure implied, for instance, by a change in user behavior, or further collection of statistics from user behavior.

The invention also considers situations where users maintain collaboratively the link/relation resources either by their behavior and interaction with the system (as in the case of the web), or through explicit user action taken to create or reinforce a relationship between nodes (writing a new web document, or creating a link from a word to a synonym or a relevant document).

The World Wide Web is an instance of such a collaborative environment. However, in some situations, it might be valuable to create a collaborative environment by installing additional software to track and or respond to user behaviors and commands. The goal would be to use this to further improve the performance of the system dynamically with time. To this end, an appropriate user interface would allow the insertion or implicit creation of linkages/implicit relationships dynamically during interaction with the system. Moreover, the resulting changes in the system could persist in order to allow subsequent or concurrent users to gain the benefit of the changes.

Description of a First Preferred Embodiment

A preferred embodiment of the method of the invention is illustrated, in flowchart form, in FIG. 1.

First, a set of entities of interest is determined (step 1). The particular choice of the appropriate entities is application-dependent, and possibly user-dependent. Numerous examples will be given below. Each participant entity is also referred to as a "node." Thus, step 1 identifies the nodes to be used in the subsequent computation.

It may also be the case that additional entities, related to the above-mentioned entities, are determined in step 1. In general, these additional entities may be characterized as subsidiary to, or otherwise related to, the above-mentioned entities. For instance, in the case where the primary entities are documents, the additional entities may include each word occurring in any of the documents, each author, each date, etc.

In step 2, an affinity is computed between any node and any other node.

Step 2 is, in suitable applications, operable only for some subset of the possible pairs of nodes. For instance, in the case of a hypertext corpus such as Web pages, step 2 is operable only for nodes between which hyperlinks exist.

Affinity matrices are optionally combined, or otherwise manipulated, to form derived affinity matrices (step 3). Where such raw affinity matrices are designated A1, A2, etc., step 3 may include combining them, using suitable matrix algebra techniques, to form a derived affinity matrix, designated A.

In step 4, similarities are computed.

The affinity matrix represents the raw data which is input to step 4. One or more affinity matrices are combined to create a similarity matrix. The obtained similarity matrix is then used in the rest of the computation.

A few examples of methods which may be used in step 4 to obtain the similarity matrix (denoted M) from affinity matrices (denoted A) are listed below.

1. Combination:

$$A = \text{COMBINE\_AFFINITY}(A1, A2 \ldots)$$

where COMBINE_AFFINITY is an operation such as sum, min, max, average, or a linear combination of the preceding, applied termwise.

2. Matrix Product:

$$A = Ai \times Aj \times \ldots$$

Here, the operator "x" denotes matrix product. The indices i, j. etc., index the affinity measures. An index can appear multiple times within a product, if desired.

3. Transposed Products.

$$M = A^T A$$

$$M = A A^T$$

4. Averaging.

$$M = \tfrac{1}{2}(A + A^T)$$

5. Dimensionality Boosting.

$$M = \begin{vmatrix} 1 & A \\ A^T & 1 \end{vmatrix}$$

In this instance, the boosted matrix M, which is square-shaped, includes the (possibly rectangular) affinity matrices A and $A^T$ at opposite corners, and fills in the two remainder sections with unit matrices (terms 1 on the diagonal, 0 elsewhere).

It is understood that the methods specified above can be applied repeatedly, to obtain other similarity matrices. For instance, the matrix $$A = \max(A1, A2) \times \min(A1, A3)$$

The relationship between similarity values m(u,v) and affinities a(u,v) is given by the following expression:

$$m(u, v) = \sum_w a(u, w) a(v, w)$$

In this instance, the corresponding expression, in matrix algebra, is $M = AA^T$.

The relationship between similarity values m(u,v) and affinities a(u,v) is given by the following expression:

$$m(u, v) = \sum_w a(w, u) a(w, v)$$

In this instance, the corresponding expression, in matrix algebra, is $M = A^T A$.

If there are more than two sets of entities, then information can be extracted from any of the sets by combining all of the other sets and then treating them as a single set of entities with a single affinity matrix. In doing this combining, the affinities from different sets may be given different weights.

Significance is initialized to an appropriate value (step 5). For instance, where significance calculations are essentially additive in nature, the initial significance values s(v,0) for time t=0 may preferably be 1.

The time value t is preferably a discrete index, which increases by an incremental value for each iteration. The significance s(v,t) of each node v is computed iteratively (step 6), at times t=1, 2, . . . , until an appropriate termination criterion (step 7) is satisfied.

Significances are computed (step 6) from similarities or directly from affinities. A few possible techniques are illustrated, as follows:

The iterative calculation of significance values based on similarities takes the following linear form:

$$s(u, t+1) = \sum_v m(u, v) s(v, t)$$

In this instance, the corresponding expression, in matrix algebra, is $S_{t+1} = MS_t$.

The iterative calculation of significance values based on affinities takes the following linear form:

$$s(u, t+1) = \sum_v a(v, u) s(v, t)$$

In this instance, the corresponding expression, in matrix algebra, is $S_{t+1} = AS_t$.

The iterative calculation of significance values takes the following linear form:

$$s(u, t+1) = \sum_v a(v, u) s(v, t)$$

In this instance, the corresponding expression, in matrix algebra, is $S_{t+1} = A^T St$.

Any of the above iteration forms can be combined with a normalizing step where, for instance, the significance values are normalized so that their sum, or the sum of their squares, is equal to a constant.

Figure 2:
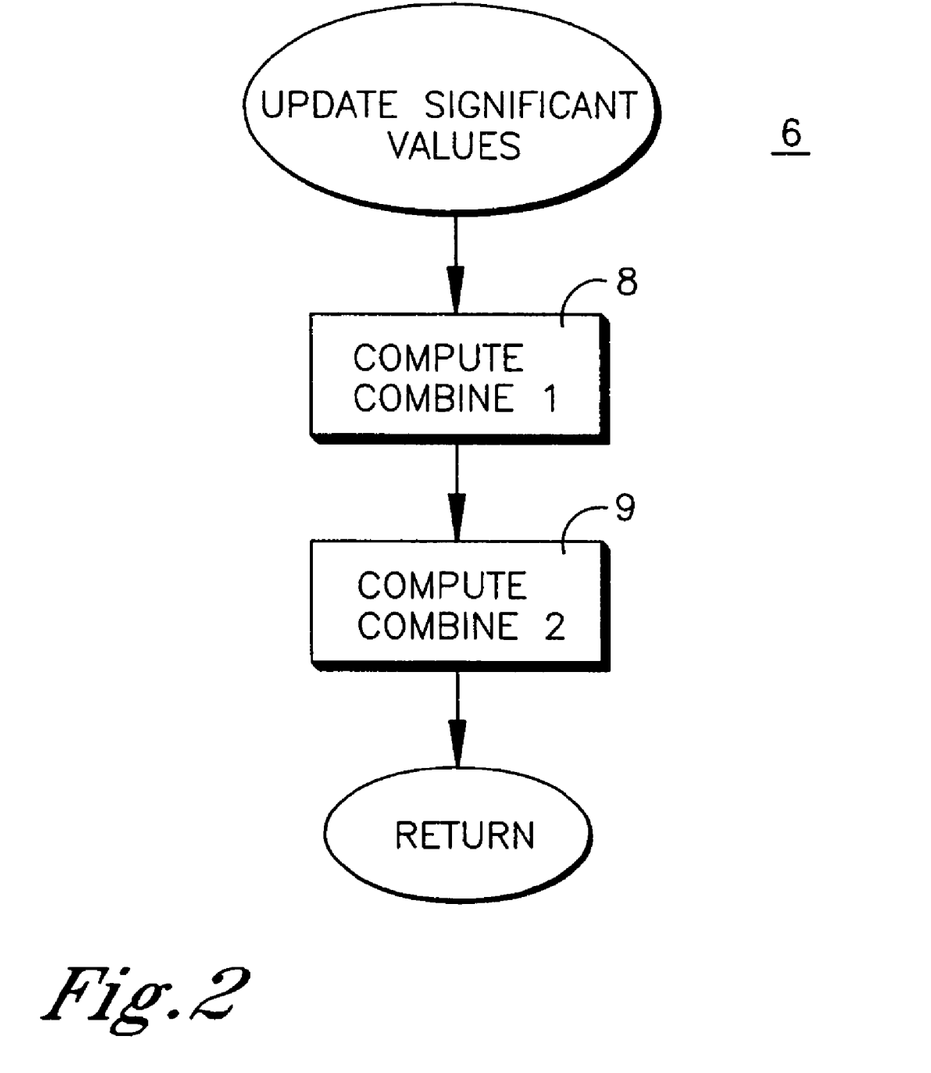
FIG. 2 is a more detailed flowchart of a portion of FIG. 1, illustrating a first embodiment of the invention.

The iterative significance computation (step 6) may be chosen as appropriate for the particular application. FIG. 2 depicts this iterative computation of step 6 in more detail. For the present discussion, the computation performed in step 6 will be described using the general designation of functions COMBINE1 (step 8) and COMBINE2 (step 9). An iteration of step 6 is given by the general expression $$s(v, t+1) = \text{COMBINE2 (COMBINE1}(m(u, v), s(u, t)))$$

where the COMBINE2 operation is performed over all nodes u.

For instance, the COMBINE1 operation may be a product of the affinity the node v has for another node u, and the significance of the other node u. After the COMBINE1 products are obtained for all the other nodes u, the COMBINE2 operation may simply be a summation of the products to give a final, updated significance value for the node v.

It will be seen, intuitively, that a node likely to have significance is a node that will have relatively large affinities to relatively significant other nodes. This calculation will tend to produce a large calculated result for such a significant node.

It can be shown that, for a class of COMBINE1/COMBINE2 operations, the significance values converge to a steady state. This follows from a standard mathematical reduction that shows that this computation is equivalent to computing the eigenvectors of a matrix by the power iteration method. See, for instance, Golub et al., "Matrix Computations," Johns Hopkins University Press, 1989. It follows that any standard method for computing eigenvectors could be substituted for the power iteration method to yield the same results.

The power iteration method, as well as the other methods described in Golub et al., can be used to compute a number of eigenvectors corresponding to any similarity matrix. The significance values (as described above) correspond to the principal eigenvector, i.e., the eigenvector with the eigenvalue of largest magnitude. The subsidiary eigenvectors, namely those with eigenvalues of smaller magnitude, also contain useful information, and can as such be viewed as providing a significance value corresponding to each entity. For a class of COMBINE1/COMBINE2 operations, these subsidiary eigenvectors can also be shown to converge to a steady state (see Golub and van Loan).

In fact, one may stop the iterations after either (1) the set of K entities at the top or bottom K positions of an eigenvector does not change from iteration to iteration (so that the corresponding affinity components are unchanged); (2) a preset number of iterations M has been performed; or (3) the first time after a preset number of M iterations when the set of K entities at the top K positions of an eigenvector does not change from iteration to iteration.

It now follows that any standard method may be used to compute these subsidiary eigenvectors. Each such subsidiary eigenvector represents an implicit grouping of the entities. Typically, the entities are grouped, which correspond with the largest or the smallest components in the subsidiary eigenvector.

Each such grouping is an affinity component. An example is the largest K or the smallest K entries of the subsidiary eigenvector, for a chosen positive integer K.

Completion and Output

When the criterion is satisfied (step 7), the method is completed. Suitable criteria will be known to persons skilled in the art, and will become evident in light of the particular applications to which the invention will be put. However, two preferred approaches to the convergence test will now be given.

First, well-known numerical analysis convergence criteria may be employed to test for convergence of the significance values.

Alternatively, a less onerous test may be used, to check that an ordering of the significance values is stabilizing.

Figure 4:
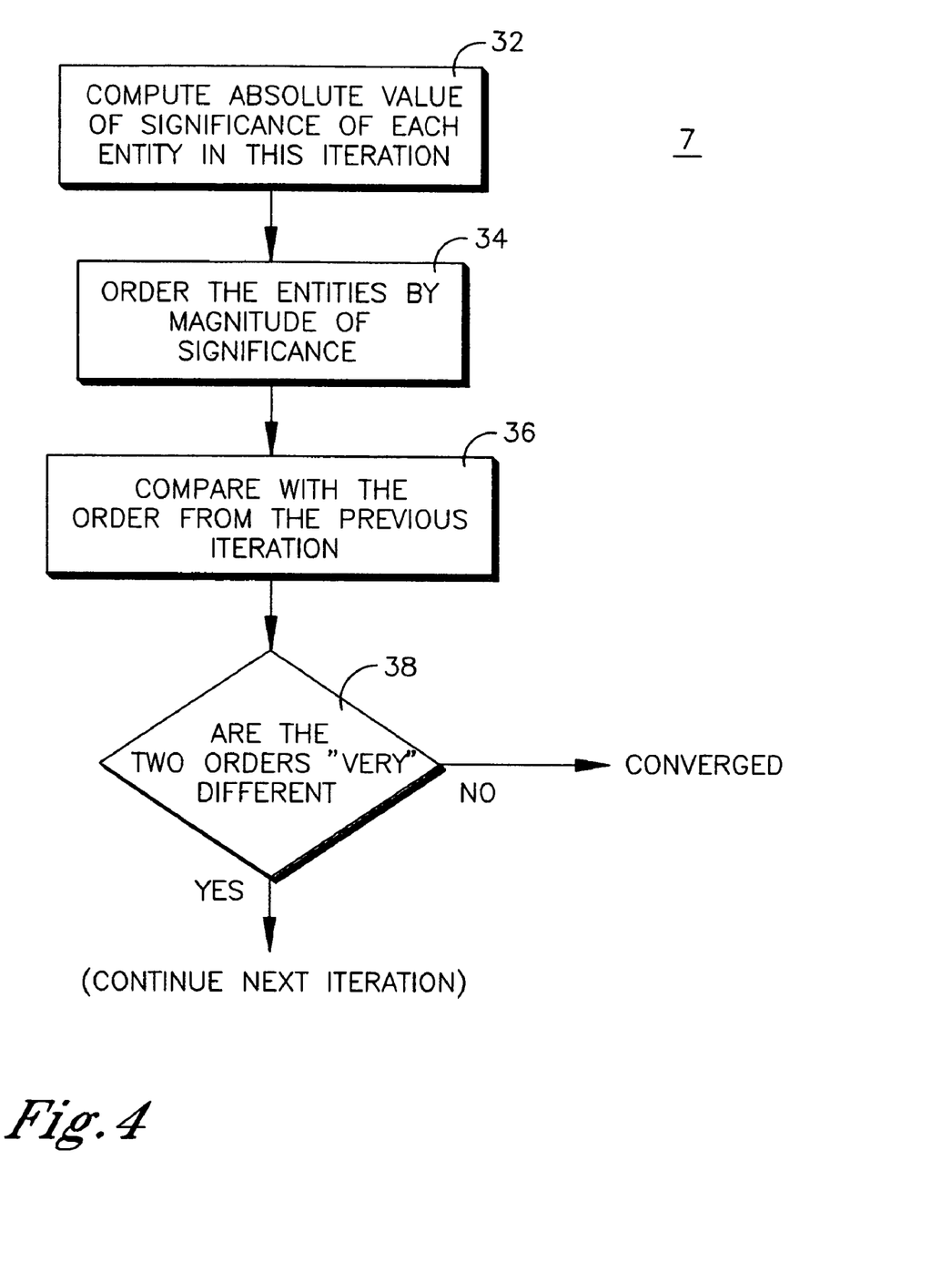
FIG. 4 is a more detailed flowchart of a portion of the method of FIG. 1.

FIG. 4 illustrates a more detailed implementation of the test made in step 7. The test receives, as input, a set of significance values produced by the current iteration. In step 32, executed as appropriate, absolute values of significances for choice" and "pro-life" factions have much less interaction with each other than they do within themselves.

This dichotomy would manifest itself through affinity components derived from one of the subsidiary eigenvectors when the entities consists of literature on abortion.

Second Embodiment of the Invention—General Case

Next, the general case will be described, of multiple similarities between nodes, and multiple significances at each node. The implementation is substantially similar to that shown in FIG. 1, except for differences that will be discussed.

A vector of significances is associated with each node. The vectors are of the form $$S(v, t) = (s(v, 1, t), \ldots, s(v, k, t))$$

at time t, where k is the number of terms of the significance vector, is being computed. The significance values in the significance vector are initialized in step 5, as before.

Similarly, a vector of similarities $$M(u,v)=(m(u,v,1), \ldots a(u,v,m))$$

is associated with each pair of nodes (u,v), where m is the number of terms of terms of the similarity vector, is being computed. The similarity values of the similarity vectors are obtained in step 4, also as before.

Typically the number k of terms in the significance vector is equal to the number m of terms in the similarity vector. This, the index value i is used here for both. More broadly, however, in cases where there are multiple significance values for a given similarity, it will be the case that m≦k.

The terms of the significance vector of each node are iteratively computed at times t=1, 2, ... until an appropriate termination criterion (step 7) is satisfied.

The primary difference between this embodiment and the above-described first embodiment will now be given. Step 6 of FIG. 1, the significance term update calculations, is implemented as shown in FIG. 3.

Figure 3:
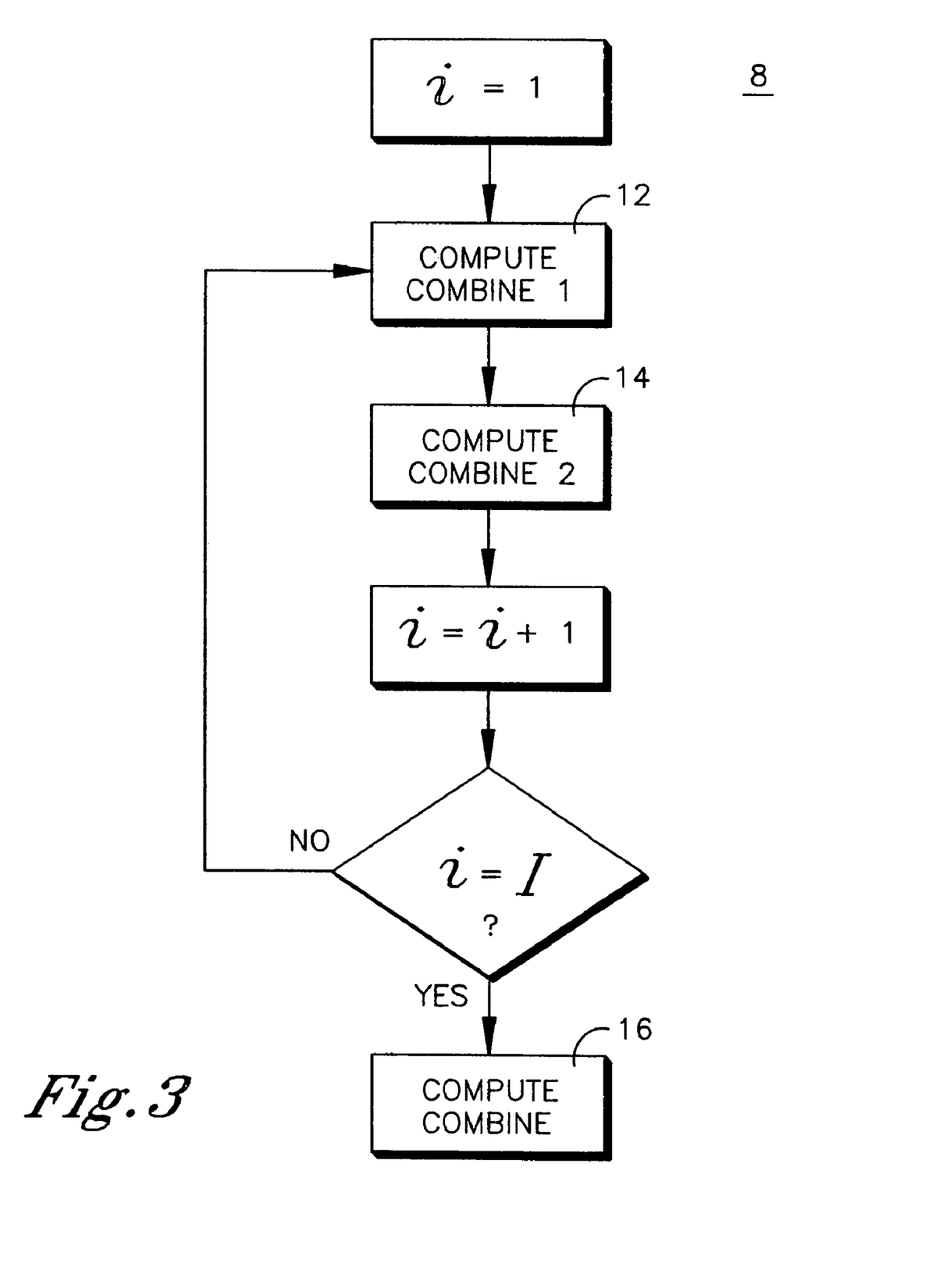
FIG. 3 is a more detailed flowchart of a portion of FIG. 1, illustrating a second embodiment of the invention.

Referring to FIG. 3, there is shown an implementation of step 6 for the above-described case of multiple similarities. For each significance, a calculation is performed in steps 12 and 14, substantially similar to that of FIG. 2, as follows:

$$x(v, i, t+1)=\text{COMBINE2}(\text{COMBINE1}(s(v, i, t), a(u, v, i)))$$

Here, the term i is used as an index for the similarities, having an integral value from 1 to I, where I is the number of similarities for which the calculation is to be made. Then, an overall calculation is performed (step 16), which is global to all the affinities and/or significances for a given node. The overall calculation produces an overall significance value for the node, as follows:

$$S(v, t+1)=\text{COMBINE}(x(v, i, t), a(u, v))$$

where the operations are performed over all nodes u, and all dimensions i.

It can be shown that, for a class of COMBINE operations, the significance values converge to a steady state. For instance, the COMBINE operation can include normalization along some or all of the dimensions, or terms, of the vectors making up rows or columns of the matrix.

This follows from a standard mathematical reduction that shows that this computation is equivalent to computing the eigenvectors of a matrix by the power the entities are produced. Accordingly, magnitudes will be considered, and factors, such as signs of the significance values, which may produce misleading clustering or ranking, are eliminated. (Of course, where such factors are necessary for appropriate clustering or ranking, step 32 may be omitted).

In step 34, the entities are ordered based on the significance values. Again, this ordering is dependent on the appropriateness of the result of step 32.

In step 36, a convergence test is employed. For instance, in the case of the stabilization of ordering, the test is to compare the current ordering with that of the previous iteration. For the numerical analysis convergence test, that appropriate test is used in place of the ordering stabilization test.

Finally, in step 38, the convergence test is made. Where stabilization of ordering is the criterion, an order stabilization test is made. Step 38 articulates the test as whether the orders are "very" different. While the test could be whether the orders are identical, or whether the order has remained identical for a predetermined number of iterations, step 38 allows for a less onerous test. "Very" different could mean, for instance, that more than a predetermined number of entities have changed position in the ordering, or whether two entities which have been adjacent to each other in the ordering are moving closer together or farther apart, so that the ordering may change in a future iteration.

In any event, where the convergence is such as to satisfy step 38, the convergence criterion of step 7 is deemed to be satisfied.

Output results are preferably in the form of either a ranking of the entities based on their significance, or a clustering of various subsets of the entities based on their affinity components.

To illustrate the concept of clustering, it has been suggested that a set of entities comprising literature on the subject of abortion would likely fall into two distinct clusters, based on inter-citation affinities, because the so-called "pro-iteration method (Kleinberg patent, Golub and van Loan textbook). It follows that any standard method for computing eigenvectors (see Golub et al.) could be substituted for the power iteration method to yield the same results.

As before, the subsidiary eigenvectors give rise to affinity components that are output.

The affinity measure may change with time. Even when the affinity measure remains fixed, the results of the computation may change if the nodes change, for instance, if new users are added to the system, new pages added to the web, old ones deleted, etc.

It should also be understood that in a distributed "client-server" environment, the computations could be performed variously at the server, the client, or any combination thereof; the computation is well-suited to being performed partially at a server and partially at the client (some details on this below in the description of preferred embodiments).

EXAMPLES OF ENVIRONMENTS IN WHICH THE INVENTION MAY BE PRACTICED

As stated above, the invention has wide applicability in many fields generally characterizable in terms of a collection of entities or resources with explicit and/or implicit, static and/or dynamic relations between them.

Examples (including a few which individually are known in the art) will now be enumerated. Each example has the following three-element format, the third element being in some cases omitted:

(1) Application domain, and what the nodes are.
(2) The applicable definition of affinity or similarity.
(3) Description of applications/impact.

Additional comments are provided, where applicable.
The examples are as follows:

The Kleinberg Ser. No. 08/813,749 patent application
(1) Entities: Hyperlinked documents, e.g., those documents returned by a search engine.
(2) Affinity measure: a(u,v)=1 if there is a hyperlink from u to v, 0 otherwise.
(3) The disclosed method seeks to identify the most authoritative sources of information in a hyperlinked corpus. Authoritativeness is judged in terms of a "hub weight" and an "authority weight".

U.S. Pat. No. 4,839,853, "Computer Information Retrieval Using Latent Semantic Structure".
(1) Entities: Documents.
(2) Similarity measure: a(u,v)=some function of the number of terms u and v have in common.

By deriving significances from the iterations, the disclosed method brings together documents discussing similar topics.

Authority Rating Using Explicit Hyperlinks
(1) Entities: Hyperlinked documents, such as documents available over the World Wide Web
(2) Affinity measure: Many reasonable forms; here is one:
Edge wt from u1 to u2 is 1 plus the number of query terms found within a specified distance window of the hypertext reference (known as the HREF in the HTML standard for the World Wide Web) to u2 in u1.

For HTML/SGML, one can use the anchor-text that is embedded with the HREF. For academic papers and reports, one can consider all occurrences of a citation in the document and the terms close to them as being associated with the citation, although the citation target is typically specified at the end in the bibliography. This embodiment typically sharpens/accelerates the search for authoritative information sources, such as those given in connection with the Kleinberg '749 patent application, the first Example above.

Relevance and Authority Rating Using Anchor-Text.
(1) Entities: Hyperlinked documents, and terms
(2) Affinity: Term t connected to a document u with edge wt=number of occurrences of t within a specified window of a hypertext reference, known as the HREF in the HTML standard for the World Wide Web, to u over some set of pages.

As above, the notion of proximity of a term to hypertext reference can be generalized depending on the document format (e.g., HTML or SGML).

By broadening this window to cover the entire document, can apply to other corpora such as patents and mail. For instance, in mail systems such as Lotus Notes, the links are mail threads (e.g., a message A links to another message B if A is a reply to B). The strength of the link depends on the amount of common vocabulary; can be used to collate related mail messages. Likewise, on the patent corpus, can be used to collate patents relating to the same area of invention.

Phrase Structure.
(1) Entity: Words
(2) Affinity: a(u,v)=average proximity of a word u to a word v in the corpus of a body of text. For example, the probability Prob(v, u) that the word v occurs in the next five words following the current word is u).

Can detect automatically that the words Bill Clinton are associated with the words President and USA. Alternately, detect that Lou Gerstner is the CEO of IBM, or that the word Jaguar has associations with cars, cats, football and computers. This will lead to a better searching tool and a better browsing mechanism. Can automatically suggest terms and phrases to add/remove from your search criteria to get better results.

Collaborative Filtering; Collaborative Filtering with Relevance Feedback.
(1) Entities: Books, movies, users, etc.
(2) Affinities: User U likes book B (this may be a numerical value indicating how much U likes B). The weights may be changed by the feedback obtained from a user. It may also be implicitly computed by the system (for instance, the system measures user U's affinity for web page P by tracking how often U accesses P in a fixed time-period); clearly this measure is time-varying.

The system can figure out that, if John Doe likes a movie and Jane Doe hates it, then you are likely to like the movie. In this context whenever the corresponding state arises with respect to a particular movie, you can be notified about it, via an automated recommendation. The same may be done for other forms of entertainment, such as books.

Collaborative Similarity Using Access Statistics.
(1) Entities: URLs/docs in a Notes-like database
(2) Affinity: Edge wt from d1 to d2 is the number of users (say in the last week) who have accessed d2 within a specified number of link-clicks after d1.

Can be used to dynamically modify contents and link-structure of pages to assist personalized navigation, target advertising, etc.

HelpDesk.
(1) Entities: Records from logs of calls into a help desk in a service organization (e.g., IGS).
(2) a(u,v)=[Number of terms common to W(u) and W(v)]/W(u). i.e. the fraction of words in a log u that are also in a log v.

Information from a log of calls can include such commonalities as common callers, common call recipients, time-of-day or day-of-week calling patterns, common call durations, etc. The general expression given above can be applied broadly to the percentage of the total calls in the log that satisfy one or more of such commonalities as these.

Image and Multimedia Search.
(1) Entities: Images or other multimedia objects.
(2) Affinity: The commonality of features and text extracted from the images/multimedia documents (the feature extraction is exemplified in methods such as the QBIC patent).

For instance, the affinity of image A for image B could be the amount of overlap in their color histograms. In the case of video the affinity could incorporate both pictorial and auditory information (the similarity of speech/music in two video clips).

This operation would yield enhanced image and multimedia search in QBIC-like systems for multimedia retrieval.

GENERALIZED CATEGORIZATIONS OF THE ABOVE EXAMPLES

The above applications may be classified into the following broad categories:

(1) Document Management:
In collections of documents with or without hyperlinks, we may use the above techniques to build collections to documents or terms that are similar. The further use of higher-order eigenvectors differentiate sub-groups of terms/documents.

(2) Collaborative Filtering:
In collections of users accessing, expressing preferences for, purchasing or using available resources (books, movies, web pages, products at a store, etc). By using the eigenvectors to group users into clusters of users with similar preferences (e.g., fans of science fiction, purchasers or designer cosmetics, etc., a user may be placed in multiple categories), it is possible to realize applications such as reccommendation systems and target marketing, in which a user is offered books/movies/items that the user has not seen before, but is likely to want (as inferred from the predilections of similar users).

(3) Event Management:
Using event logs such as service and help desk logs in a service organization, one may use the above method to discover and predict events that can be addressed proactively. For instance, if the entities are types of software/hardware being installed on systems, together with problems reported by users, one can elicit patterns of events (such as sequences and combinations of software/hardware installed in a system that result in a problem). This application is not confined to computer system components; it applies in any complex system in which sequences/combinations of maintenance events result in problem events.

SUMMARY AND CONCLUSION

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for eliciting information, useful to a user, from first and second collections of entities or resources with explicit and/or implicit, static and/or dynamic relations therebetween, the method comprising the acts of:

obtaining the first collection of entities and the second collection of entities, hyperlinks being established between at least some of the entities;

obtaining affinity values, including, for each given one of the entities, a respective affinity value for the given entity and each respective one of the other entities of the collection, whereby at least one affinity value depends at least in part on at least one hyperlink;

initializing significance values for each of the entities;

iteratively calculating updated significance values for each entity, based on the affinities and on the significance values prior to the iterative update, until a predetermined condition is reached; and obtaining the useful information based on the significance values after the final iteration of the act of iteratively calculating.

2. A method as recited in claim 1, wherein the step of obtaining affinity values includes obtaining, for each one of the given entities in the first collection, a respective affinity value for the given entity and each respective one of the entities in the second collection.

3. A method as recited in claim 1, wherein the step of obtaining first and second sets of entities includes obtaining a single set of entities as both the first set and the second set.

4. A method as recited in claim 3, wherein the step of obtaining affinity values includes obtaining, for each one of the given entities in the single set of entities, a respective affinity value for the given entity and each respective other one of the entities in the single set.

5. A method as recited in claim 1, wherein the step of obtaining affinity values includes the steps of:

obtaining a set of raw affinity values; and deriving a set of derived affinity values from the raw affinity values.

6. A method as recited in claim 5, wherein the step of deriving derived affinity values includes using one of:

a sum operation, an average operation, a min operation, a max operation, and a linear combination.

7. A method as recited in claim 1, wherein:

the method further includes the step of computing similarity values between the entities based on the affinity values; and the step of iteratively calculating updated significance values includes iteratively calculating updated significance values based on the affinities and on the significance values.

8. A method as recited in claim 7, further comprising the step of iteratively calculating a updated principal affinity component value for each entity of interest based on the affinities and similarities.

9. A method as recited in claim 8, wherein:

the step of computing similarity values includes computing a similarity matrix; and the step of iteratively calculating a updated principal affinity component value includes calculating a non-principal eigenvector of the similarity matrix.

10. A method as recited in claim 8, wherein the step of obtaining the useful information includes obtaining the useful information based on the updated principal affinity component values.

11. A method as recited in claim 10, wherein the step of obtaining the useful information based on the updated principal affinity component values includes obtaining a cluster.

12. A computerized method for eliciting information, useful to a user, from first and second collections of entities or resources with explicit and/or implicit, static and/or dynamic relations therebetween, the method comprising the acts of:

obtaining the first collection of entities and the second collection of entities;

obtaining affinity values, including, for each given one of the entities, a respective affinity value for the given entity and each respective one of the other entities of the collection, the affinity values not being constrained to be symmetric;

initializing significance values for each of the entities;

iteratively calculating updated significance values for each entity, based on the affinities and on the significance values prior to the iterative update, until a predetermined condition is reached; and     obtaining the useful information based on the significance values after the final iteration of the act of iteratively calculating.

\* \* \* \* \*